United States Patent
Ishikawa et al.

(10) Patent No.: US 10,388,256 B2
(45) Date of Patent: Aug. 20, 2019

(54) WEARABLE APPARATUS, ELECTRONIC APPARATUS, IMAGE CONTROL APPARATUS, AND DISPLAY CONTROL METHOD

(71) Applicant: Sony Corporation, Tokyo (JP)

(72) Inventors: Hirotaka Ishikawa, Kanagawa (JP); Satoshi Akagawa, Tokyo (JP); Takeshi Iwatsu, Kanagawa (JP); Chisako Kajihara, Tokyo (JP); Tsubasa Tsukahara, Tokyo (JP); Yasuki Kanema, Tokyo (JP)

(73) Assignee: Sony Corporation, Tokyo (JP)

( * ) Notice: Subject to any disclaimer, the term of this patent is extended or adjusted under 35 U.S.C. 154(b) by 39 days.

(21) Appl. No.: 15/118,246

(22) PCT Filed: Dec. 5, 2014

(86) PCT No.: PCT/JP2014/006098
§ 371 (c)(1),
(2) Date: Aug. 11, 2016

(87) PCT Pub. No.: WO2015/125196
PCT Pub. Date: Aug. 27, 2015

(65) Prior Publication Data
US 2017/0178596 A1    Jun. 22, 2017

(30) Foreign Application Priority Data
Feb. 21, 2014    (JP) .................................. 2014-032356

(51) Int. Cl.
*G09G 5/00*    (2006.01)
*G09G 5/34*    (2006.01)
(Continued)

(52) U.S. Cl.
CPC ........... *G09G 5/34* (2013.01); *G06F 3/03547* (2013.01); *G06F 3/0481* (2013.01);
(Continued)

(58) Field of Classification Search
CPC ........ G06F 3/0482; G06F 3/012; G06F 3/017; G06F 3/0346; G06F 3/04812;
(Continued)

(56) References Cited

U.S. PATENT DOCUMENTS

| 5,659,333 A | 8/1997 | Okishima |
| 2007/0028267 A1* | 2/2007 | Ostojic ............. G06F 17/30058 |
| | | 725/52 |

(Continued)

FOREIGN PATENT DOCUMENTS

| CN | 101620494 A | 1/2010 |
| CN | 102308271 A | 1/2012 |

(Continued)

OTHER PUBLICATIONS

Chinese Office Action dated Oct. 25, 2018 in connection with Chinese Application No. 201480075455.8, and English translation thereof.

(Continued)

*Primary Examiner* — Charles Tseng
(74) *Attorney, Agent, or Firm* — Wolf, Greenfield & Sacks, P.C.

(57) ABSTRACT

A wearable apparatus according to an embodiment of the present technology includes a display unit, an operation section, a storage unit, and a display control unit. The display unit is configured to display an image. The operation section is configured to receive input of a predetermined operation event for switching an image to be displayed on the display unit. The storage unit is configured to store a plurality of images to be displayed on the display unit. The (Continued)

display control unit is configured to be capable of sequentially switching the images to be displayed on the display unit every time the predetermined operation event is received, and to cause the display unit to display a first middle image during switching between the individual images from a top image to be first displayed on the display unit to a last image to be last displayed and cause the display unit to display a second middle image different from the first middle image during switching between the last image and the top image.

13 Claims, 12 Drawing Sheets

(51) Int. Cl.
  *G06F 3/0485* (2013.01)
  *G06T 13/80* (2011.01)
  *G06F 3/0488* (2013.01)
  *G06F 3/0481* (2013.01)
  *G06F 3/0354* (2013.01)
(52) U.S. Cl.
  CPC .......... *G06F 3/0485* (2013.01); *G06F 3/0488* (2013.01); *G06T 13/80* (2013.01); *G06F 3/04855* (2013.01); *G09G 2340/0464* (2013.01); *G09G 2354/00* (2013.01)
(58) Field of Classification Search
  CPC ... G06F 3/04883; G06F 3/0485–04855; G06T 13/80
  See application file for complete search history.

(56) References Cited

U.S. PATENT DOCUMENTS

| | | | | |
|---|---|---|---|---|
| 2009/0064031 | A1* | 3/2009 | Bull | G06F 3/0485 715/784 |
| 2009/0172596 | A1 | 7/2009 | Yamashita | |
| 2009/0292980 | A1* | 11/2009 | Swineford | G06F 17/21 715/202 |
| 2010/0205563 | A1 | 8/2010 | Haapsaari et al. | |
| 2012/0272181 | A1 | 10/2012 | Rogers et al. | |
| 2013/0106914 | A1* | 5/2013 | Jain | G06F 3/0482 345/666 |
| 2013/0246967 | A1 | 9/2013 | Wheeler et al. | |
| 2013/0346915 | A1* | 12/2013 | Kuehnle | G06F 3/0482 715/799 |
| 2015/0106742 | A1* | 4/2015 | Kim | H04L 51/046 715/752 |

FOREIGN PATENT DOCUMENTS

| | | |
|---|---|---|
| CN | 103493000 A | 1/2014 |
| JP | H05-257457 A | 10/1993 |
| JP | 2000-276278 A | 10/2000 |
| JP | 2005-292621 A | 10/2005 |
| JP | 2009-159197 A | 7/2009 |
| JP | 2012-027797 A | 2/2012 |
| JP | 2012-517630 A | 8/2012 |
| WO | WO 2010/089722 A1 | 8/2010 |
| WO | WO 2013/138607 A1 | 9/2013 |
| WO | WO 2013/192254 A2 | 12/2013 |

OTHER PUBLICATIONS

Japanese Office Action dated Nov. 27, 2018 in connection with Japanese Application No. 2016-503795, and English translation thereof.

Chinese Office Action dated Apr. 17, 2019 in connection with Chinese Application No. 201480075455.8 and English translation thereof.

* cited by examiner

WEARABLE APPARATUS, ELECTRONIC APPARATUS, IMAGE CONTROL APPARATUS, AND DISPLAY CONTROL METHOD

CROSS REFERENCE TO RELATED APPLICATIONS

This application is a National Stage of International Application No. PCT/JP2014/006098, filed in the Japanese Patent Office as a Receiving Office on Dec. 5, 2014, which claims priority to Japanese Patent Application No. JP 2014-032356, filed in the Japanese Patent Office on Feb. 21, 2014 which are hereby incorporated by reference in their entirety.

TECHNICAL FIELD

The present technology relates to a wearable apparatus capable of sequentially switching and displaying a plurality of images according to user's operations, to an electronic apparatus, to an image control apparatus, and to a display control method.

BACKGROUND ART

An electronic apparatus capable of displaying a plurality of images on the display unit in order has been known. For example, Patent Document 1 (paragraph [0089]) describes an electronic apparatus including a display capable of displaying a plurality of thumbnail images in order, in which, when a top thumbnail image departs from a display region, it is rearranged at the last of the plurality of thumbnail images present in a non-display region. With this, it is possible to circulate the thumbnail images between the display region and the non-display region.

Patent Document 1: Japanese Patent Application Laid-open No. 2011-210138

SUMMARY OF INVENTION

Problem to be Solved by the Invention

However, in the electronic apparatus that sequentially circulates and displays the images while changing the images displayed on the display unit to other images according to user's operations, it is difficult to discriminate the last image from the top image. Therefore, there is a fear that the user may be confused thinking that an infinite number of images are present.

In view of the above-mentioned circumstances, it is an object of the present technology to provide a wearable apparatus capable of intuitively recognizing switching between a last image and a top image when sequentially circulating and displaying a plurality of images, an electronic apparatus, an image control apparatus, and a display control method.

Means for Solving the Problem

A wearable apparatus according to an embodiment of the present technology includes a display unit, an operation section, a storage unit, and a display control unit.

The display unit is configured to display an image.

The operation section is configured to receive input of a predetermined operation event for switching an image to be displayed on the display unit.

The storage unit is configured to store a plurality of images to be displayed on the display unit.

The display control unit is configured to be capable of sequentially switching the images to be displayed on the display unit every time the predetermined operation event is received. The display control unit is configured to cause the display unit to display a first middle image during switching between the individual images from a top image to be first displayed on the display unit to a last image to be last displayed. The display control unit is configured to cause the display unit to display a second middle image different from the first middle image during switching between the last image and the top image.

In accordance with the wearable apparatus, during switching between the last image and the top image, the middle image different from that displayed during switching between the other images is displayed on the display unit. Thus, it is possible for the user to intuitively recognize switching between the last image and the top image.

The first middle image may have a first reproduction time, and the second middle image may have a second reproduction time longer than the first reproduction time.

The first middle image may include a first animation image. In the first animation image, the currently displayed first image disappears from the display unit while moved in a predetermined direction and at the same time the second image to be displayed subsequently to the first image is displayed on the display unit while moved the second image in the predetermined direction.

On the other hand, the second middle image may include a second animation image in which one image of the top image and the last image disappears from the display unit while moved in the predetermined direction and then the other image is displayed on the display unit while moved in the predetermined direction.

In this case, the second animation image may further include a predetermined image. The predetermined image is displayed after the one image disappears from the display unit and before the other image is displayed on the display unit.

Further, the display control unit may be configured to display the second animation image smaller than the first animation image.

The top image and the last image may include predetermined images to be displayed at symmetrical positions.

The display control unit may be configured to cause the display unit to further display a scroll bar that is moved synchronously with switching between the images.

The display control unit may be configured to cause the display unit to divide and display the scroll bar when causing the display unit to display the second middle image.

The display control unit may be configured to cause the scroll bar to disappear from the display unit when causing the display unit to display the second middle image.

The wearable apparatus may further include a sound output unit. The sound output unit may be configured to reproduce a first sound when the first middle image is displayed on the display unit, and reproduce a second sound different from the first sound when the second middle image is displayed on the display unit.

An electronic apparatus according to an embodiment of the present technology includes a display unit, an operation section, a storage unit, and a display control unit.

The display unit is configured to display an image.

The operation section is configured to receive input of a predetermined operation event for switching an image to be displayed on the display unit.

The storage unit is configured to store a plurality of images to be displayed on the display unit.

The display control unit is configured to be capable of sequentially switching the images to be displayed on the display unit every time the predetermined operation event is received. The display control unit is configured to cause the display unit to display a first middle image during switching between the individual images from a top image to be first displayed on the display unit to a last image to be last displayed. The display control unit is configured to cause the display unit to display a second middle image different from the first middle image during switching between the last image and the top image.

An image control apparatus according to an embodiment of the present technology includes an operation section, a storage unit, and a display control unit.

The operation section is configured to receive input of a predetermined operation event for switching an image to be displayed on a display unit of an electronic apparatus.

The storage unit is configured to store a plurality of images to be displayed on the display unit.

The display control unit is configured to be capable of sequentially switching the images to be displayed on the display unit every time the predetermined operation event is received. The display control unit is configured to cause the display unit to display a first middle image during switching between the individual images from a top image to be first displayed on the display unit to a last image to be last displayed. The display control unit is configured to cause the display unit to display a second middle image different from the first middle image during switching between the last image and the top image.

A display control method according to an embodiment of the present technology is a display control method for an electronic apparatus including a display unit, including sequentially switching images to be displayed on the display unit every time a predetermined operation event is received.

A first middle image is displayed on the display unit during switching between the individual images from a top image to be first displayed on the display unit to a last image to be last displayed.

A second middle image different from the first middle image is displayed on the display unit during switching between the last image and the top image.

A wearable apparatus according to another embodiment of the present technology includes a display unit, an operation section, a storage unit, and a display control unit.

The display unit is configured to display an image.

The operation section is configured to receive input of a predetermined operation event for switching an image to be displayed on the display unit.

The storage unit is configured to store a plurality of images to be displayed on the display unit.

The display control unit is configured to be capable of sequentially switching the images to be displayed on the display unit every time the predetermined operation event is received. The display control unit is configured to display predetermined images, which are not present in the other images, in a top image to be first displayed on the display unit and a last image to be last displayed.

Effects of the Invention

As described above, in accordance with the present technology, the user can intuitively recognize switching between a last image and a top image when a plurality of images are sequentially circulated and displayed.

It should be noted that the effect described here is not necessarily limitative and may be any effect described in the present disclosure.

MODE(S) FOR CARRYING OUT THE INVENTION

Hereinafter, embodiments according to the present technology will be described with reference to the drawings.

<First Embodiment>

[Overall Configuration of Information Processing System Using Wearable Apparatus]

Figure 1:
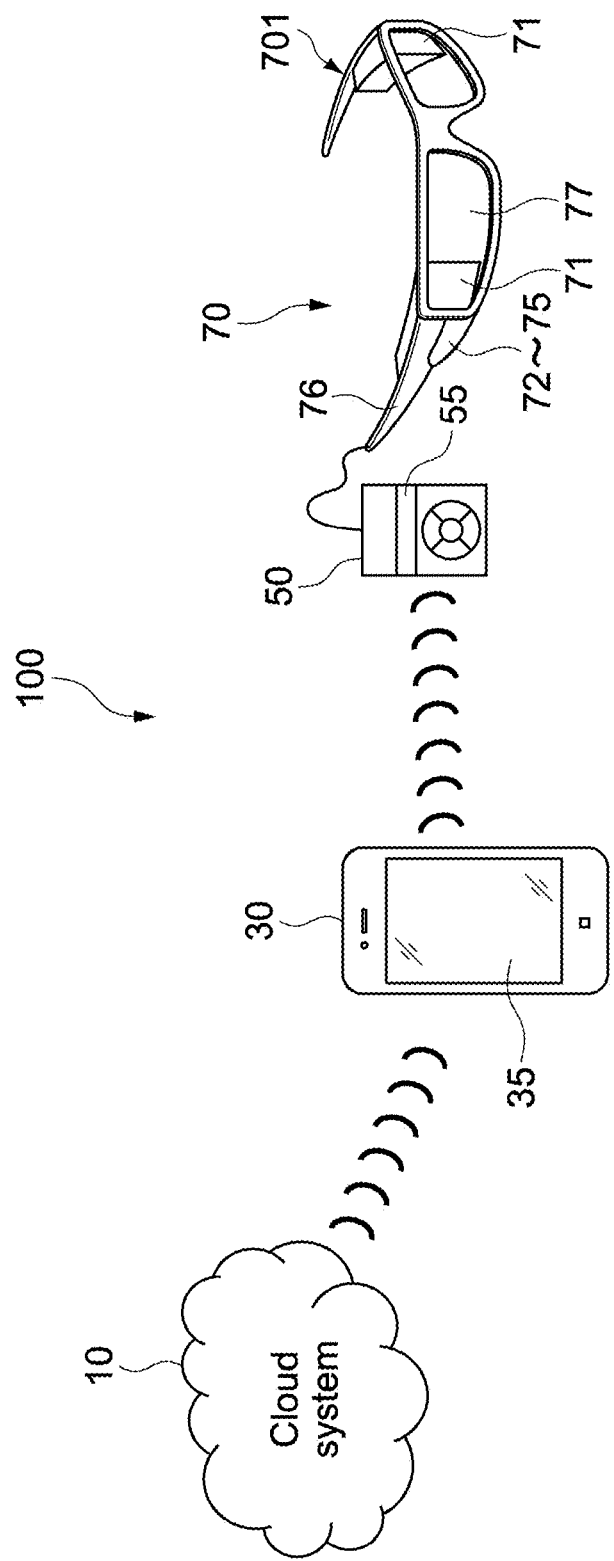
FIG. 1 A diagram showing a configuration of an information processing system according to the present technology.

FIG. 1 shows a configuration of an information processing system according to the present technology.

This system 100 mainly includes a portable terminal 30, a wearable apparatus (wearable display) 70 as an electronic apparatus, and a control box 50 that functions as a control apparatus that controls this wearable apparatus 70.

The portable terminal 30 functions as an information processing apparatus and is typically a mobile phone such as a smartphone. The portable terminal 30 may be a tablet device or another PC (Personal Computer).

The wearable apparatus 70 is, as shown in the figure, of a head-mounted type. However, it is not limited thereto and may be, for example, of a wrist band type or a neck band type.

The portable terminal 30 is configured to be connected to a cloud system 10. The cloud system 10 includes a server computer and the like connected to, for example, a telecommunications network such as the Internet.

Typically, the control box 50 is wiredly connected to the wearable apparatus 70. A user can operate the wearable apparatus 70 by putting the wearable apparatus 70 on his/her head and operating the control box 50 with his/her fingers.

[Configurations of Respective Devices]

Figure 2:
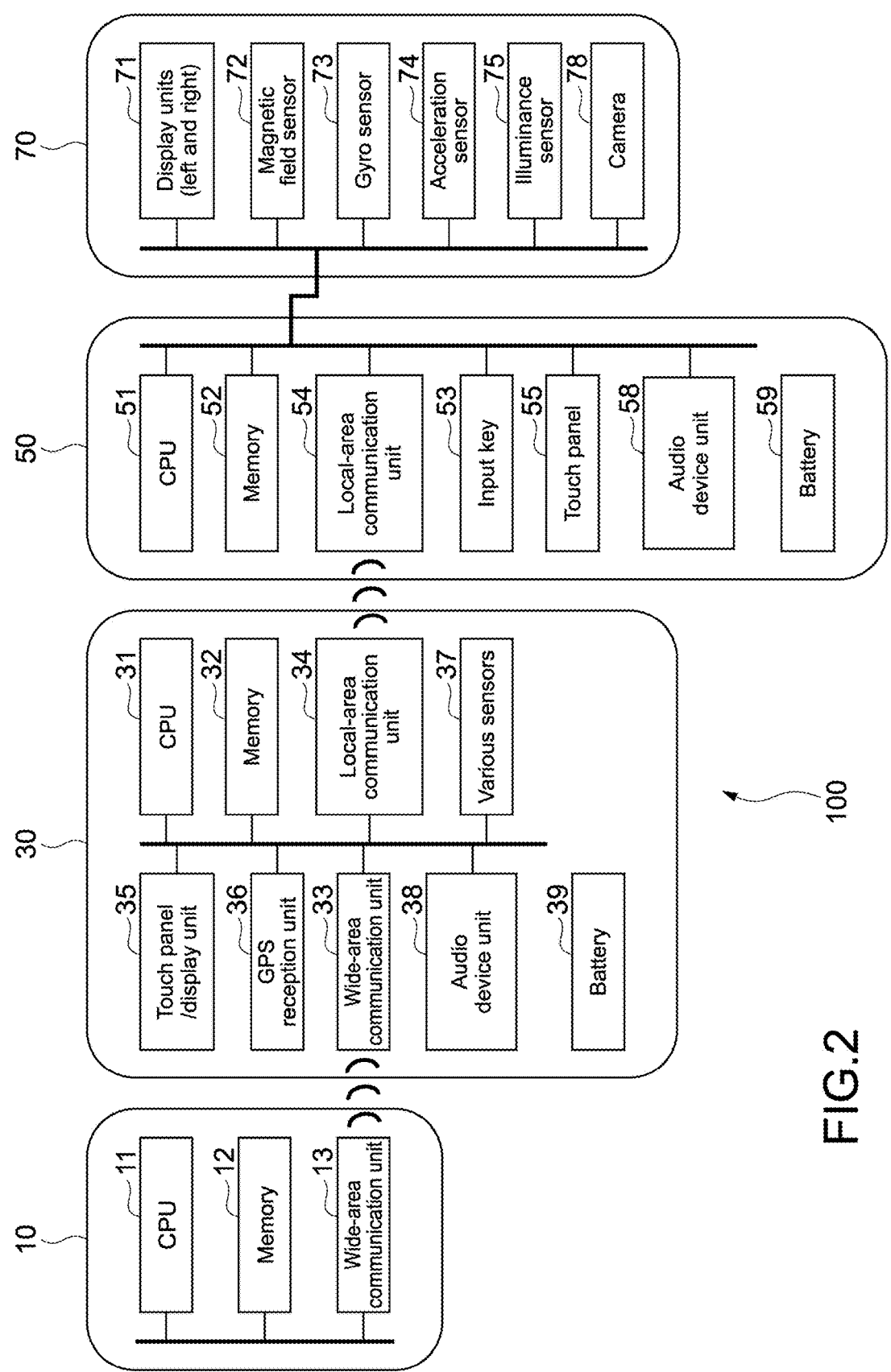
FIG. 2 A block diagram showing configurations of respective devices of the system.

FIG. 2 is a block diagram showing configurations of respective devices of this system 100.

(Portable Terminal)

The portable terminal 30 (e.g., smartphone) mainly includes a CPU (Central Processing Unit) 31, a memory 32, a touch panel/display unit 35, a wide-area communication unit 33, and a local-area communication unit 34. In addition to them, the portable terminal 30 further includes various sensors 37 including a motion sensor, a camera, and the like, a GPS (Global Positioning System) reception unit 36, an audio device unit 38, a battery 39, and the like. At least the portable terminal 30 (or the portable terminal 30 and the cloud system 10) functions as an external apparatus of the wearable apparatus 70.

The wide-area communication unit 33 is configured to be communicable by a communication system, for example, 3G (Third Generation) or LTE (Long Term Evolution). The local-area communication unit 34 is configured to be communicable by, for example, a wireless LAN (Local Area Network) communication system such as WiFi and/or a short-distance wireless communication system such as Bluetooth® and infrared communication. The local-area communication unit 34 functions as a "reception unit" and a "transmission unit" from/to the control box 50.

In addition to the local-area communication unit 34, the portable terminal 30 may include, for example, an individual identification device using a so-called short-distance wireless communication system such as an RFID (Radio Frequency IDentification).

The audio device unit 38 includes a microphone and a speaker.

(Wearable Apparatus)

The wearable apparatus 70 includes a mounting unit 701 configured to be mountable on the user's head. The mounting unit 701 includes a display unit 71, various sensors 72 to 75, a camera 78, and the like.

The display unit 71 is, as shown in FIG. 1, a small projector disposed at each of the left and right of a frame 76 of the head-mounted type wearable apparatus 70, for example. In the head-mounted type wearable apparatus 70, identical image light or image light having a disparity, which is emitted by each projector, is guided by a light guide plate 77 and emitted from a predetermined region of the light guide plate 77 toward a user's eyeball.

Note that the display unit 71 may be provided in only one of the left and right of the wearable apparatus 70. The wearable apparatus 70 is not limited to the projector type and may include the display unit 71 of a type directly emitting image light to the eyeball.

Examples of the various sensors of the wearable apparatus 70 can include a magnetic field sensor 72, a gyro sensor 73, an acceleration sensor 74, and an illuminance sensor 75. The wearable apparatus 70 may include a sensor or the like that detects a field-of-view direction (azimuth or elevation and depression angles).

The gyro sensor 73 (angular velocity sensor) and the acceleration sensor 74 are configured as motion sensors that detect motions in a space of the mounting unit 701.

The camera 78 constitutes an imaging unit capable of imaging an object in the user's field-of-view direction. The camera 78 is mounted on the mounting unit 701.

The camera 78 is capable of capturing still and moving images. In addition to a normal imaging mode based on a user's operation, the camera 78 is configured to be capable of being driven on an interval imaging mode. On the interval imaging mode, still images are automatically captured at every predetermined time.

(Control Box)

The control box 50 includes a CPU 51, a memory 52 (storage unit), a local-area communication unit 54, an input key 53, a touch panel 55, an audio device unit 58, a battery 59, and the like.

The control box 50 may be configured as an accessory device of the wearable apparatus 70 (e.g., part of wearable apparatus 70) or may be configured as a controller independent of the wearable apparatus 70. The control box 50 is configured as an image control apparatus that controls the display of an image to be displayed on the display unit 71 of the wearable apparatus 70.

The CPU 51 generally controls the respective units of the control box 50 and the wearable apparatus 70. The control box 50 may include, instead of the CPU 51, a PLD (Programmable Logic Device) such as an FPGA (Field Programmable Gate Array).

The local-area communication unit 54 is configured to be communicable with the local-area communication unit 34 of the portable terminal 30 by the above-mentioned communication system. The local-area communication unit 54 functions as a "reception unit" or a "transmission unit" from/to the portable terminal 30.

The input key 53 are one or more physical keys that are arranged in the control box 50 and operated by the user. The input key 53 includes, for example, a power key, a back key, an on/off key of the display unit 71, and a shutter button of the camera 78.

The touch panel 55 is an operation device disposed on a surface of the control box 50 (see FIG. 1) and operated by the user. The input key 53 and the touch panel 55 function as an "operation section" for the wearable apparatus 70.

The audio device unit 58 includes a microphone and a speaker.

The control box 50 may include, in addition to the local-area communication unit 54, for example, a communication device using the short-distance wireless communication system such as the above-mentioned RFID. With this, the user can start predetermined application software of the portable terminal 30 and move the portable terminal 30 closer to the control box 50, to thereby substantially automatically pair these devices.

Further, for example, by the user moving the portable terminal 30 closer to the control box 50, the portable terminal 30 may substantially automatically download application software for pairing them from a cloud such that it can be installed.

As a matter of course, the control box 50 is capable of, even without such a device for short-distance wireless communication, performing pairing with the portable terminal 30 by the use of the local-area communication unit 54.

(Cloud System)

For example, a server computer in the cloud system 10 includes a CPU 11, a memory 12, and a wide-area communication unit 13 configured to be communicable with the portable terminal 30.

[Configuration of Software]

Figure 3:
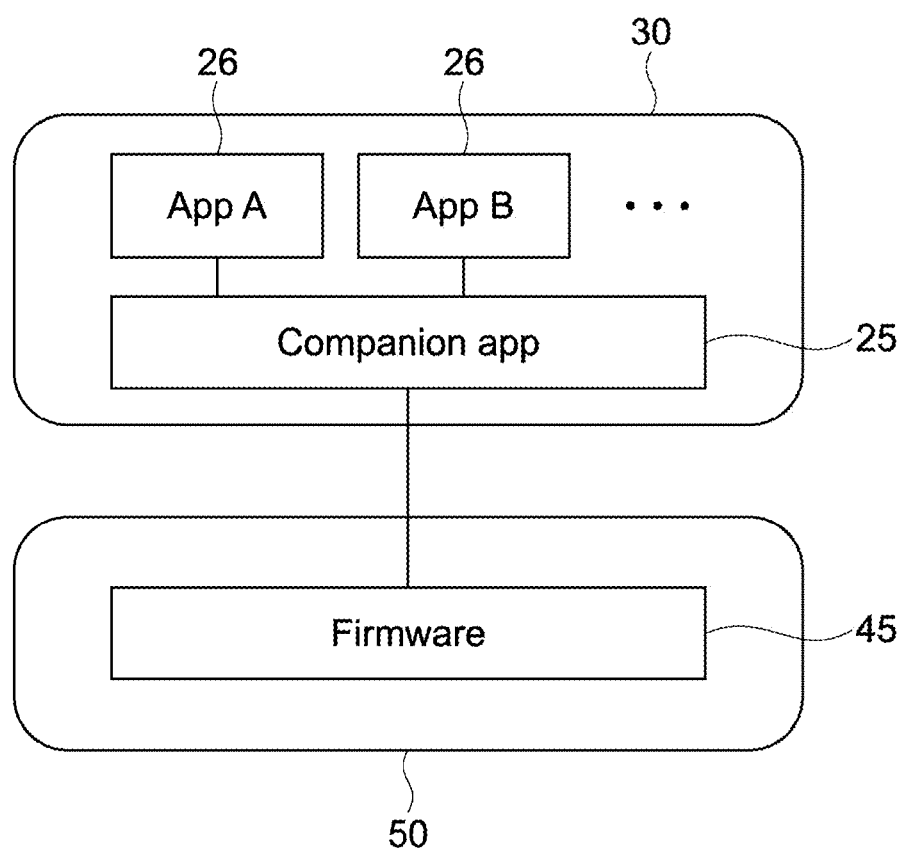
FIG. 3 A diagram showing a configuration of software installed into a portable terminal and a control box in the system.

FIG. 3 shows a configuration of software installed into the portable terminal 30 and the control box 50.

The portable terminal 30 stores general application software (hereinafter, simply referred to as "apps") 26 and a companion app 25 in the memory 32. These apps 25 and 26 are configured to work on an OS (Operating System) installed in the portable terminal 30 by default.

As to the kind of the general apps 26, there are, for example, an SNS (Social Networking Service) app of a mini blog, a communication site, and the like, a voice recognition app, a camera app, media reproduction, news, and weather forecast services.

The companion app 25 functions to convert default data and user data on those apps 26 into data in a format suitable for display on the display unit 71 of the wearable apparatus 70. By the portable terminal 30 downloading, for example, the companion app 25 from the cloud system 10, the companion app 25 is installed into the portable terminal 30.

The control box 50 includes, in the memory 52, firmware 45 that cooperates with the companion app 25 after the pairing. A camera app for operating the camera 78, a setting app on a setting screen to be described later, and the like are installed in the firmware 45 by default.

[Screen Example to be Displayed by Wearable Apparatus and Operation Example of this System]

(Screen Example to be Displayed by Wearable Apparatus)

Figure 4:
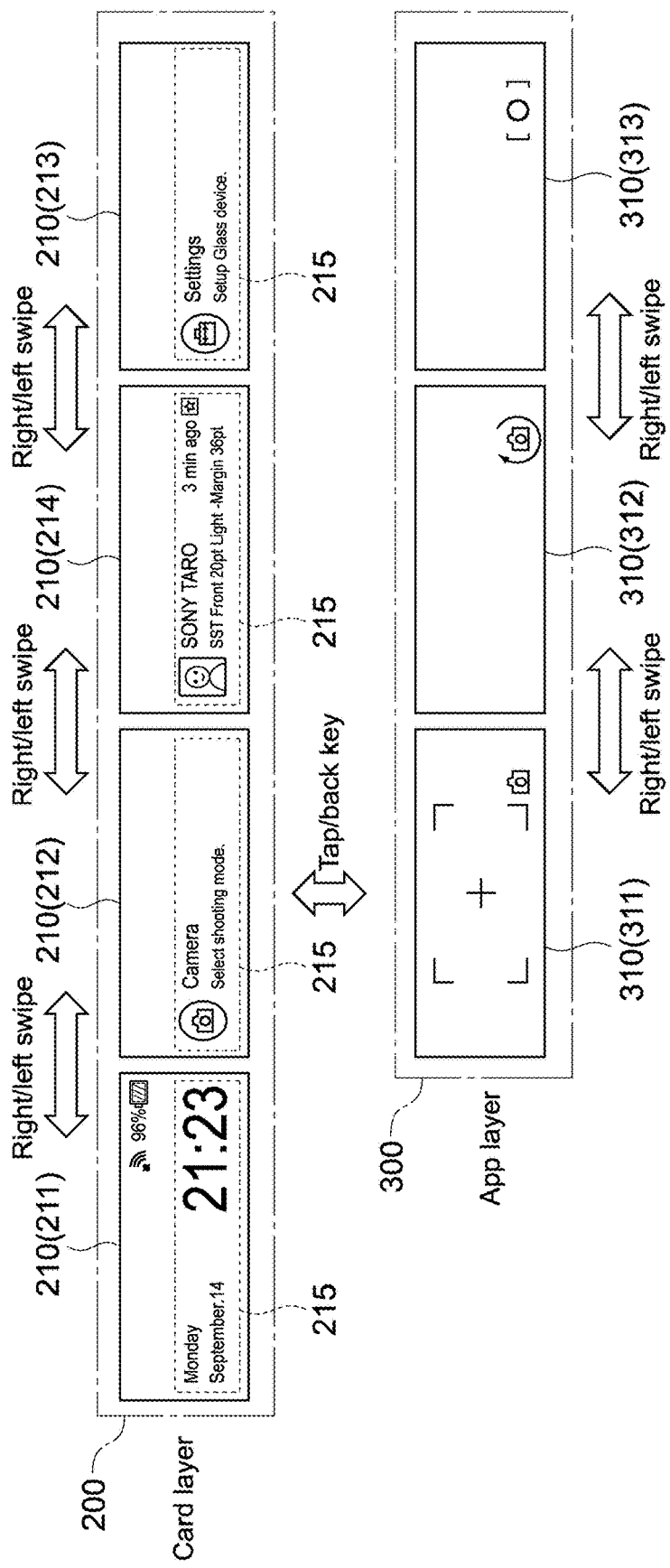
FIG. 4 A diagram explaining a switching operation of a card screen to be displayed on the display unit.

FIG. 4 shows an example of a screen to be displayed on the display unit 71 of the wearable apparatus 70. Hereinafter, for the sake of description, it is assumed that a subject that performs processing of the portable terminal 30 is the companion app 25 and a subject that performs processing of the control box 50 is the firmware 45.

(Screen Example of Card Layer)

The layer shown in the upper section of FIG. 4 will be referred to as a "card layer." A card layer 200 includes, for example, various card screens 210 including a home screen 211, a camera screen 212, a setting screen 213, and the like by default. In addition to them, the card layer 200 includes a card screen 214 of the apps 26 (see FIG. 3) registered by the user.

Each of the card screens 210 includes a card image 215 located in a substantially lower-half region, for example, of the entire region of the card screen. The region occupied by a single card screen 210 (and an app screen 310 to be described later) is a display region (Viewport) of the display unit 71. In the following description, the image in the region occupied by the card screen 210 will be referred to as a "card image." Here, the card image (excluding card image of home screen 211) is like an icon or a widget, which is a GUI (Graphical User Interface) for accessing an app. One card image 215 is provided for one card screen 210.

The user can add the card screens 210 (card images 215) by registering them. For example, the user uses the portable terminal 30 to perform a registration operation with respect to an app 26 installed in the portable terminal 30. Then, the companion app 25 generates a card image 215 corresponding to such an app 26.

The card image 215 corresponding to the app refers to an image including a mark or a character that represents the app in the card image 215, for example. Basically, the companion app 25 stores the card images 215 generated by itself in the memory 32 and the firmware 45 also stores a predetermined numbers of card images 215 of them in the memory 52.

The firmware 45 of the control box 50 is configured to display those card screens 210 on the display unit 71 one by one. Regarding the same layer, by the user inputting a left/right swipe operation via the touch panel 55, the firmware 45 causes the display unit 71 to display those card screens 210 in order.

Note that "settings" of the card screens 210, which can be accessed from the setting screen 213, are also one of the app software modules, which is a default built-in app of the control box 50.

(Screen Example of Application Layer)

The layer shown in the lower section of FIG. 4 will be referred to as an "app layer 300." The app layer 300 can be basically accessed via the card layer 200. The app layer 300 includes (app images on) app screens 310 on which apps of the card screens 210 have been started.

The display unit 71 displays those app screens 310 one by one. The user can access the app layer 300 via the card layer 200. For accessing the app layer 300, the user performs a tap operation on the touch panel 55 with a card screen 210 selected in the card layer 200 being displayed on the display unit 71. Then, the firmware 45 causes the display unit 71 to display an app screen 310 corresponding to that card screen 210.

For returning from the app screen 310 to the card screen 210, the user presses the back key provided as the input key 53 (see FIG. 2) of the control box 50.

By performing a swipe operation with respect to the touch panel 55 in the left- and right-hand directions with an arbitrary app screen 310 being displayed in the app layer 300, the user can switch the app screen 310 in the single app. For example, it is possible to switch between a first function of an app and a second function of the app that is different from the first function. The number of functions (number of app images) varies depending on the app.

If the app is a camera app, as shown in FIG. 4, the camera app includes a screen 311 of a still image-capturing mode as the first function, a screen 313 of an interval imaging mode as the second function, and a screen 313 of a moving image-capturing mode as the third function, for example.

Note that the direction of the swipe operation by the finger of the user and a moving direction of an image may be the same or may be opposite. It can be changed by user settings.

(Switching Process of Card Screens in Card Layer)

All the registered card images 215 are stored in the memory 52 of the control box 50. The firmware 45 extracts a card image 215, which is specified by the user via the touch panel 55, from the memory 52 in order and displays it on the display unit 71.

Figure 5:
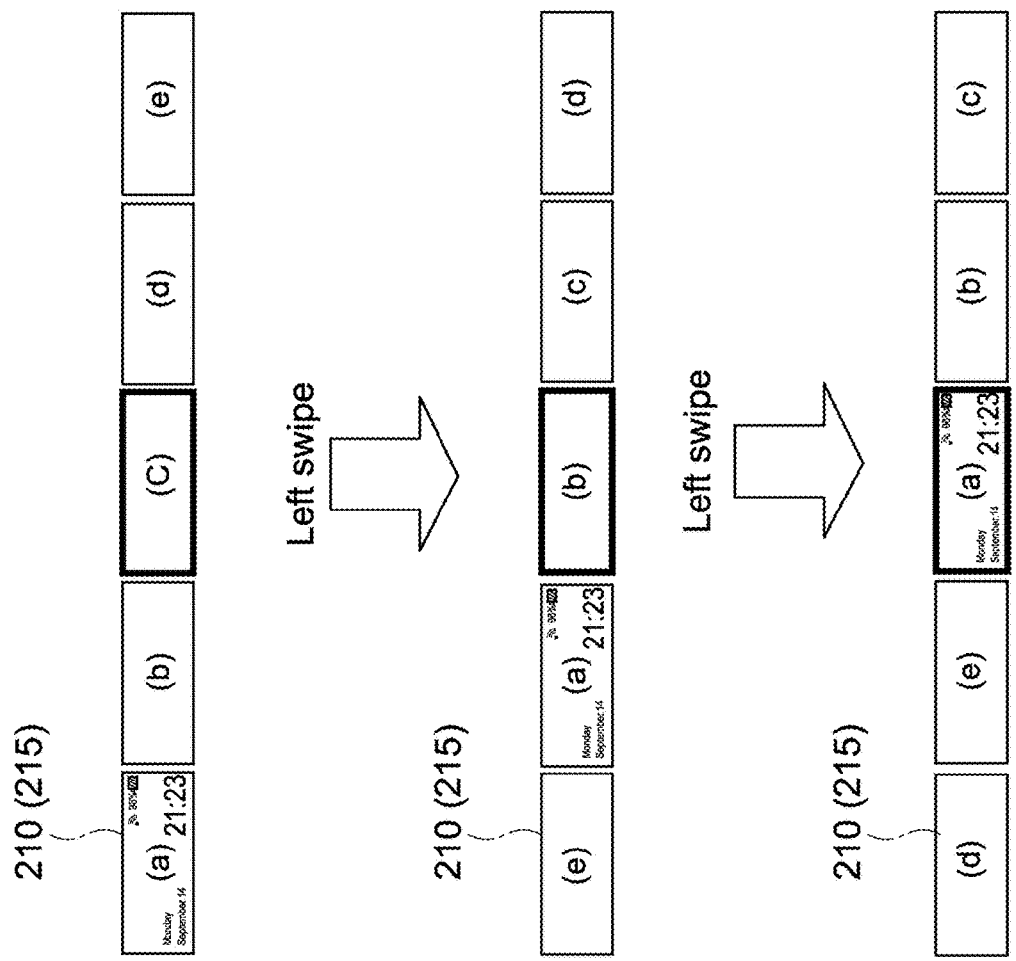
FIG. 5 An image diagram for explaining a switching operation of a card screen to be displayed on the display unit.

FIG. 5 is an image diagram for explaining a switching operation of the card screens 210 in the card layer 200 in the control box 50.

As shown in the upper section of FIG. 5, it is, for example, assumed that the memory 52 of the control box 50 stores five card images 215(a) to 215(e). The five card images 215(a) to (e) are continuous card images 215. Then, in the current state, the card image 215(c) shown with the bold frame is currently displayed on the display unit 71.

The card image 215(a) is a card image of the home screen. The card image 215(a) is an image (top image) in the card layer 200, which is to be first displayed on the display unit 71. The card image 215(e) is an image (last image) in the card layer 200, which is to be last displayed on the display unit 71.

It is assumed that, from the state shown in the upper section of FIG. 5, the user inputs a swipe operation to move the card screens 210 to the left. Then, the firmware 45 switches the currently displayed card image 215(c) to the card image 215(b) as shown in the middle section of FIG. 5. When the user further inputs a swipe operation to move the card screens 210 to the left, the firmware 45 switches the currently displayed card image 215(b) to the card image (a) as shown in the lower section of FIG. 5.

As shown in the middle section of FIG. 5, when the card image 215(c) is switched to the card image 215(b), the arrangement of the images is changed such that the card image 215(e) located at the right end is moved to the left-hand side of the card image 215(a). Similarly, as shown in the lower section of FIG. 5, when the card image 215(b) is switched to the card image 215(a), the arrangement of the images is changed such that the card image 215(d) located at the right end is moved to the left-hand side of the card image 215(b).

Note that, in the case of a right swipe operation, the arrangement of the images is changed such that the card image located at the left end is sequentially moved to the right end by each operation.

As described above, the card images 215(a) to (e) are sequentially circulated in the swipe operation direction and displayed on the display unit 71. With this, movement from the last image to the head image can be realized by a single swipe operation, and hence it becomes possible to achieve an improvement in the operability. Further, it is possible to prevent the user from being confused by the fact that the image is not changed even by a further swipe operation in the same direction even though the last image is displayed.

Hereinafter, such an image-circulating and displaying function will be also referred to as an "image loop function" and the boundary between the top image (card image 215(a) in FIG. 5) and the last image (card image 215(e) in FIG. 5) will be also referred to as a "loop gap."

By the way, in the above-mentioned image loop function, there is a fear that the user cannot recognize the loop gap and may be confused or misunderstand, thinking that an infinite number of applications are present.

In view of this, for causing the user to intuitively recognize the loop gap, the wearable apparatus 70 (or the control box 50) according to this embodiment is configured to cause the display unit 71 to display different middle images during switching between the top image and the last image and during switching between the other images.

That is, the display control method according to this embodiment includes a step of sequentially switching the image to be displayed on the display unit 71 every time a predetermined operation event is received, a step of causing the display unit 71 to display a first middle image during switching between individual images from the top image to be first displayed on the display unit 71 to the last image to be last displayed, and a step of causing the display unit 71 to display a second middle image different from the first middle image during switching between the last image and the top image.

Figure 6:
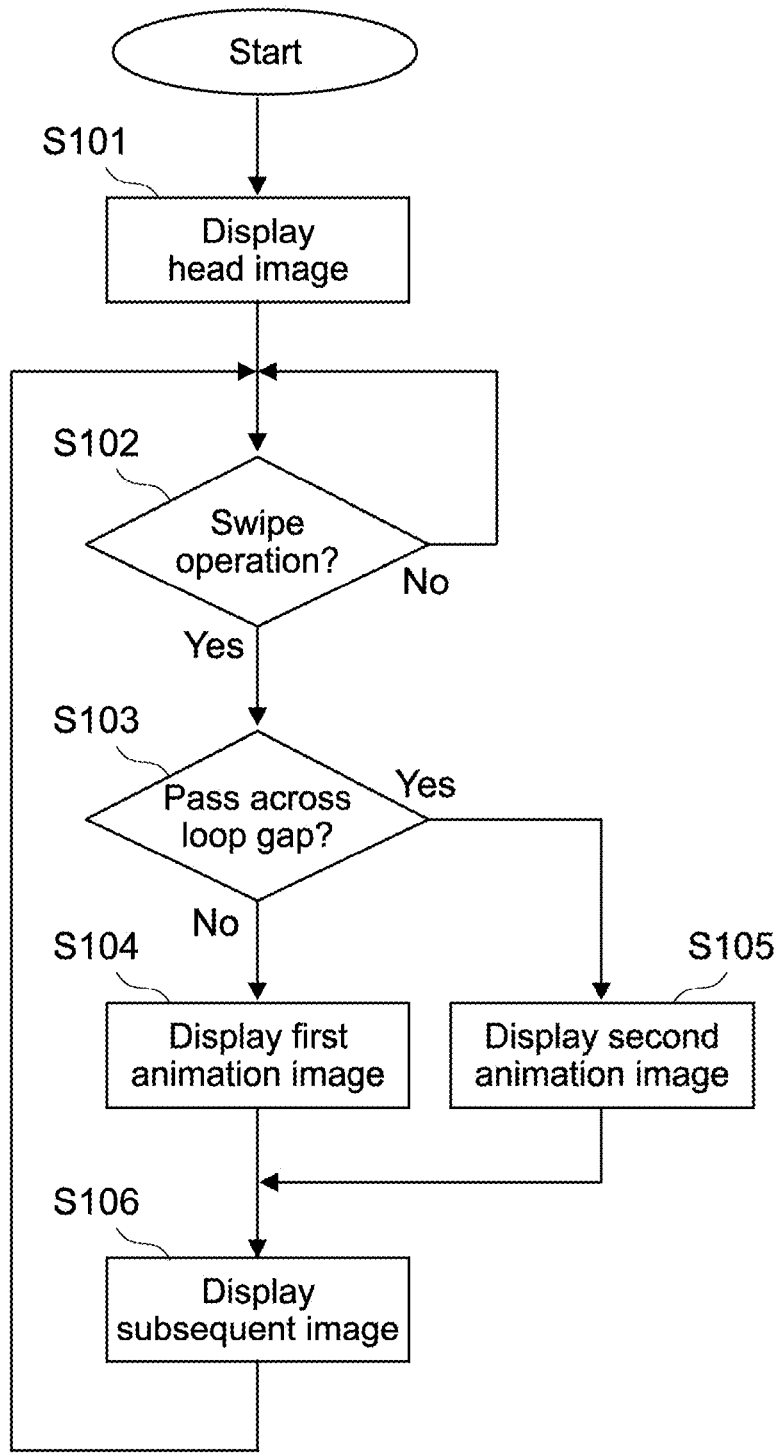
FIG. 6 A flowchart explaining a display control method according to an embodiment of the present technology.

FIG. 6 is a flowchart explaining the display control method executed by the firmware 45 (control box 50).

The firmware 45 causes the display unit 71 to display an initial image (top image) set in advance in the card layer 200 (Step S101). Then, the firmware 45 detects whether or not the operation event (in this example, swipe operation made by the user with respect to the touch panel 55) is input. If the swipe operation is not made, the firmware 45 stands by until the swipe operation is made (Step S102).

If detecting the swipe operation with respect to the touch panel 55, the firmware 45 determines, based on the swipe direction, whether or not the switching direction of the card image passes across the loop gap (Step S102). Specifically, in the case of movement between the top image and the last image, the firmware 45 determines that it passes across the loop gap. On the other hand, in the case of movement between the other images (individual images from top image to last image), the firmware 45 determines that it does not pass across the loop gap.

Then, if determining that it does not pass across the loop gap, the firmware 45 causes the display unit 71 to display the first middle image and then causes the display unit 71 to display the subsequent image (Steps S104, S106). In contrast, if determining that it passes across the loop gap, the firmware 45 causes the display unit 71 to display the second middle image and then causes the display unit 71 to display the subsequent image (Steps S105, S106).

The first middle image and the second middle image are stored in the memory 52. The first middle image and the second middle image are formed of images different from each other. This enables the user to intuitively recognize switching between the last image and the top image.

The first and second middle images may be still images or may be moving images. In this embodiment, the first middle image and the second middle image include a first animation image and a second animation image, respectively. A reproduction time of the second middle image is set to be longer than a reproduction time of the first middle image.

After causing the display unit 71 to display the subsequent image, the firmware 45 receives a swipe operation made by the user with respect to the touch panel 55 and thereafter executes the same processing as described above. In the above-mentioned display control, the firmware 45 or the CPU 51 functions as a "display control unit."

Figure 7:
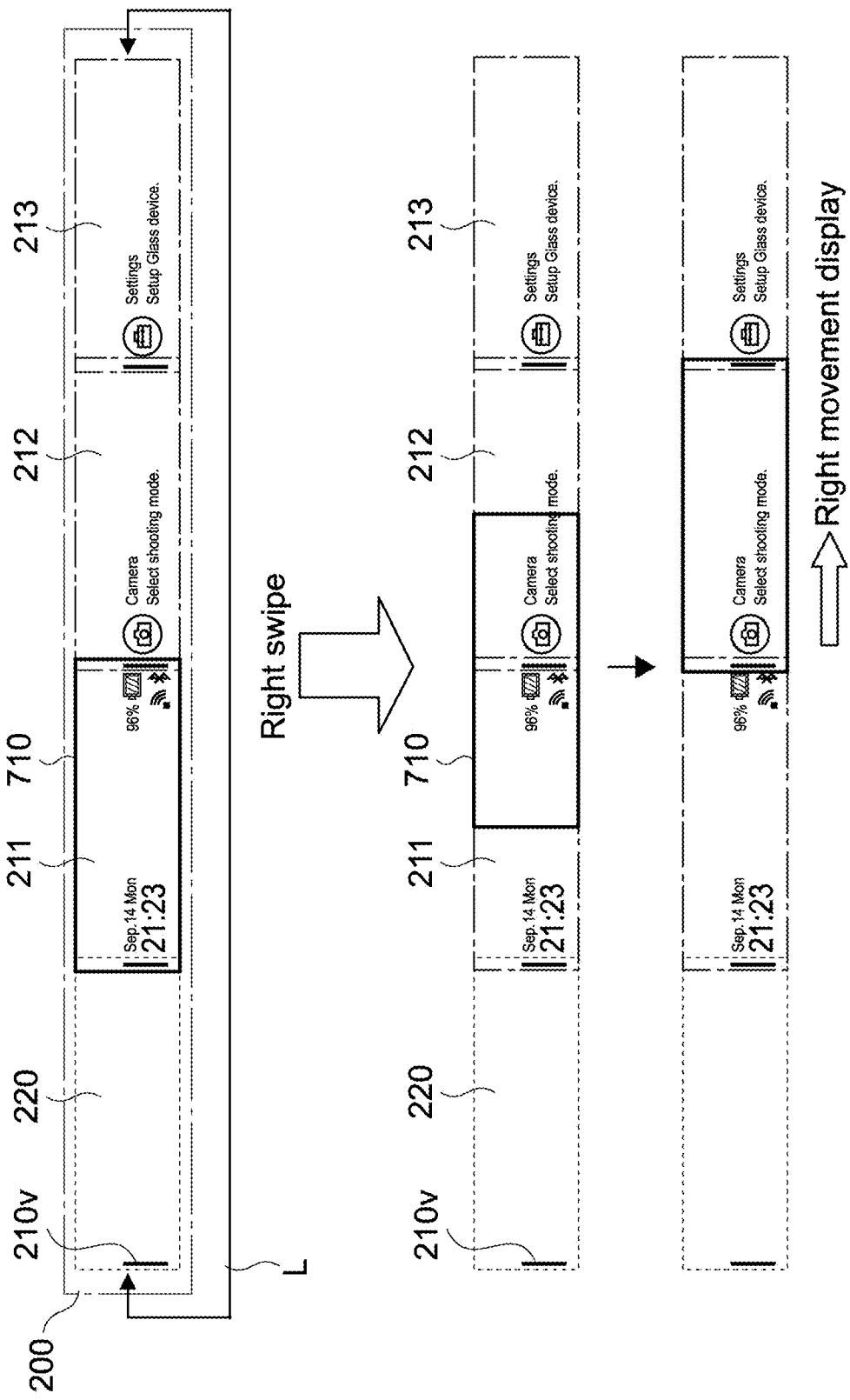
FIG. 7 An image transition diagram explaining a first animation image according to the embodiment of the present technology.
Figure 8:
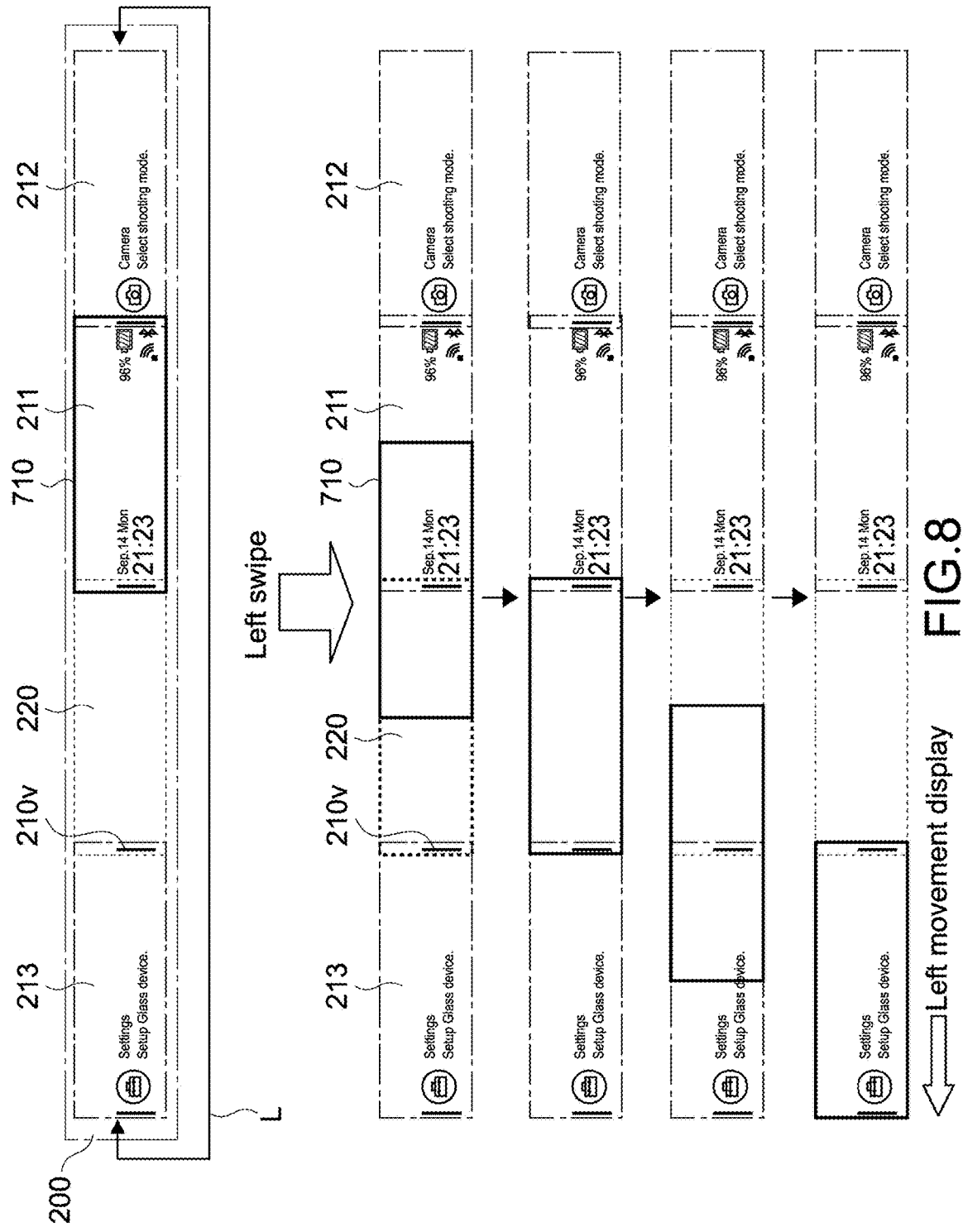
FIG. 8 An image transition diagram explaining a second animation image according to the embodiment of the present technology.

Hereinafter, the first and second animation images will be described by exemplifying switching between the card images 215 in the card layer 200. FIG. 7 is an image transition diagram explaining the first animation image. FIG. 8 is an image transition diagram explaining the second animation image.

Here, for easy understanding, the images (card images) belonging to the card layer 200 includes three including the home screen 211, the camera screen 212, and the setting screen 213. The home screen 211 is set as the top image and the setting screen 213 is set as the last image. The camera screen 212 is disposed between the home screen 211 and the setting screen 213.

As shown in the upper section of FIG. 7 and the upper section of FIG. 8, in the card layer 200, an image not including app information (hereinafter, referred to as blank image 215) is disposed in the portion between the home screen 211 and the setting screen 213 that corresponds the loop gap. A blank screen 220 is set to have the same size as that of the home screen 211 or the like.

The region shown in a solid line in each of the figures indicates a display region 710 displayed on the display unit 71. Further, the arrows L bidirectionally linking between the card image located at the left end and the card screen located at the right end indicate a loop for circulating and displaying the screens.

When detecting a right swipe operation to slide the display region 710 to the right in a state in which the home screen 211 (top image) is displayed, the firmware 45 causes the display unit 71 to reproduce the first animation image as shown in FIG. 7 and then display the camera screen 212.

As sequentially shown in the two pictures in the lower section of FIG. 7, in the first animation image, the image of the currently displayed home screen 211 disappears from the display region 710 while moved in the left-hand direction and the image of the camera screen 212 is displayed as the subsequent image in the display region 710 while moved in the left-hand direction. That is, the first animation image corresponds to a moving image representing a state in which the display region 710 is moved at a predetermined speed in the right-hand direction in FIG. 7.

On the other hand, when detecting a left swipe operation to slide the display region 710 to the left in a state in which the home screen 211 (top image) is displayed, the firmware

45 causes the display unit 71 to reproduce the second animation image as shown in FIG. 8 and then display the setting screen 213.

As sequentially shown in the four pictures in the lower section of FIG. 8, in the second animation image, the image of the home screen 211 disappears from the display region 710 while moved in the right-hand direction, and then the image of the setting screen 213 is displayed in the display region 710 while moved in the right-hand direction. That is, the second animation image corresponds to a moving image representing a state in which the display region 710 is moved in the left-hand direction at the above-mentioned predetermined speed in FIG. 8.

The second animation image includes the blank screen 220, and hence has a reproduction time longer than that of the first animation image. Thus, the time period of the animation image is varied in the same single swipe operation. In this example, the reproduction time of the second animation image is twice as long as that of the first animation image. This enables the user to intuitively recognize that the transition between the images has passed across the loop gap.

Regarding the screen transition from the camera screen 212 to the setting screen 213 according to the right swipe operation, an animation image (first animation image) similar to that described above is displayed. Also in screen transition from the setting screen 213 to the camera screen 212 according to a left swipe operation and screen transition from the camera screen 212 to the home screen 211 according to a left swipe operation, the animation image (first animation image) when the display region 710 is moved in left-hand direction at the above-mentioned predetermined speed is displayed.

Also in screen transition from the setting screen 213 to the home screen 211 according to the right swipe operation, the animation image (second animation image) when the display region 710 is moved in the right-hand direction at the above-mentioned predetermined speed is displayed.

As described above, in this embodiment, during switching between the last image (setting screen 213) and the top image (home screen 211), the display unit 71 is configured to display the middle image different from that displayed during switching between the other images. With this, when the plurality of images are displayed by the loop function, it becomes possible to cause the user to intuitively recognize switching between the last image and the top image.

Further, in accordance with this embodiment, it is possible to easily adjust the reproduction time of the second animation image by changing the size of the blank screen 220.

In addition, the blank screen 220 may be a screen including no images or may include a predetermined image different from app information. For example, the second animation image may further include a predetermined image to be displayed after either one of the top image and the last image disappears from the display unit 71 and before the other image is displayed on the display unit 71.

As the predetermined image, a plurality of boundary images 210v to be displayed between two adjacent card screens, for example, as shown in FIGS. 7 and 8. Each of the boundary images 210v is an image of a vertical line and shared between the two adjacent card screens. By displaying such a boundary image 210v on the blank screen 220, it is possible to display the loop gap in an emphasized manner. Note that the number and form of boundary images 210v are not particularly limited and any number and forms may be employed.

Alternatively, the predetermined image may be an image to be displayed at symmetrical positions of the top image and the last image. For example, as shown in the upper section of FIG. 9, the home screen 211 as the top image includes, at a left end thereof, a boundary image 210v1 different from the boundary image 210v. On the other hand, as shown in the lower section of FIG. 9, the setting screen 213 as the last image includes, at a right end thereof, a boundary image 210v2 different from the boundary images 210v and 210v1. The boundary images 210v1 and 210v2 are displayed at symmetrical positions of the home screen 211 and the setting screen 213. Note that the camera screen 212 is not shown in the lower section of FIG. 9.

The boundary image 210v1 is an image of a vertical line with a triangle arrow on a left center side thereof and the boundary image 210v2 is an image with a vertical line with a triangle arrow on a right center side thereof. Although those arrows are each set to indicate the presence of the blank screen 220 located in a direction thereof, it is not limited thereto as a matter of course.

Figure 9:
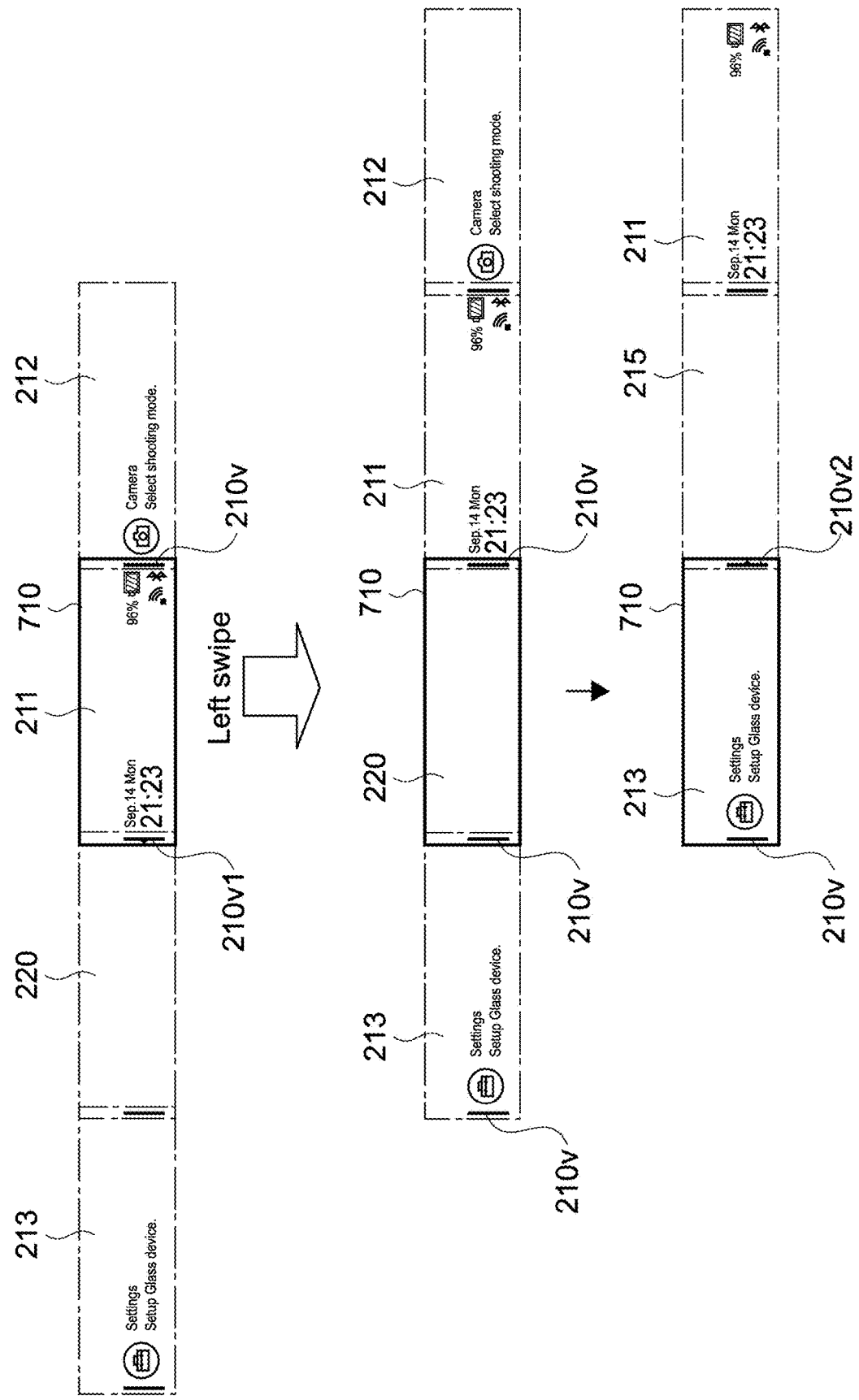
FIG. 9 A diagram showing of a modified example of the second animation image.

Further, the boundary images 210v1 and 210v2 are displayed as normal boundary images 210v during screen transition to the blank screen 220 as shown in the middle section of FIG. 9 and are set to be first displayed during switching to the home screen 211 as the top image or the setting screen 213 as the last image. Note that it is not limited thereto and the boundary images 210v1 and 210v2 may be configured to be displayed as they are also during screen transition to the blank screen 220.

As described above, by displaying the boundary images 210v1 and 210v2 at symmetrical positions of the home screen 211 and the setting screen 213, respectively, it becomes possible for the user to recognize the home screen 211 as the top image and the setting screen 213 as the last image, respectively.

Further, for displaying the top image and the last image to the user in an emphasized manner, the display of the boundary image 210v may be omitted from the other screen (camera screen 212), for example. That is, the firmware 45 may be configured to display the predetermined images (boundary images 210v and 210v1 or 210v2) not included in the other image (camera screen 212), in the top image (setting screen 211) and the last image (setting screen 213), respectively. Also on such a display mode, it is possible to provide the boundary image 210v itself with a function of indicating the presence of the loop gap. Depending on the need, the blank screen 220 may be omitted.

<Second Embodiment>

Figure 10:
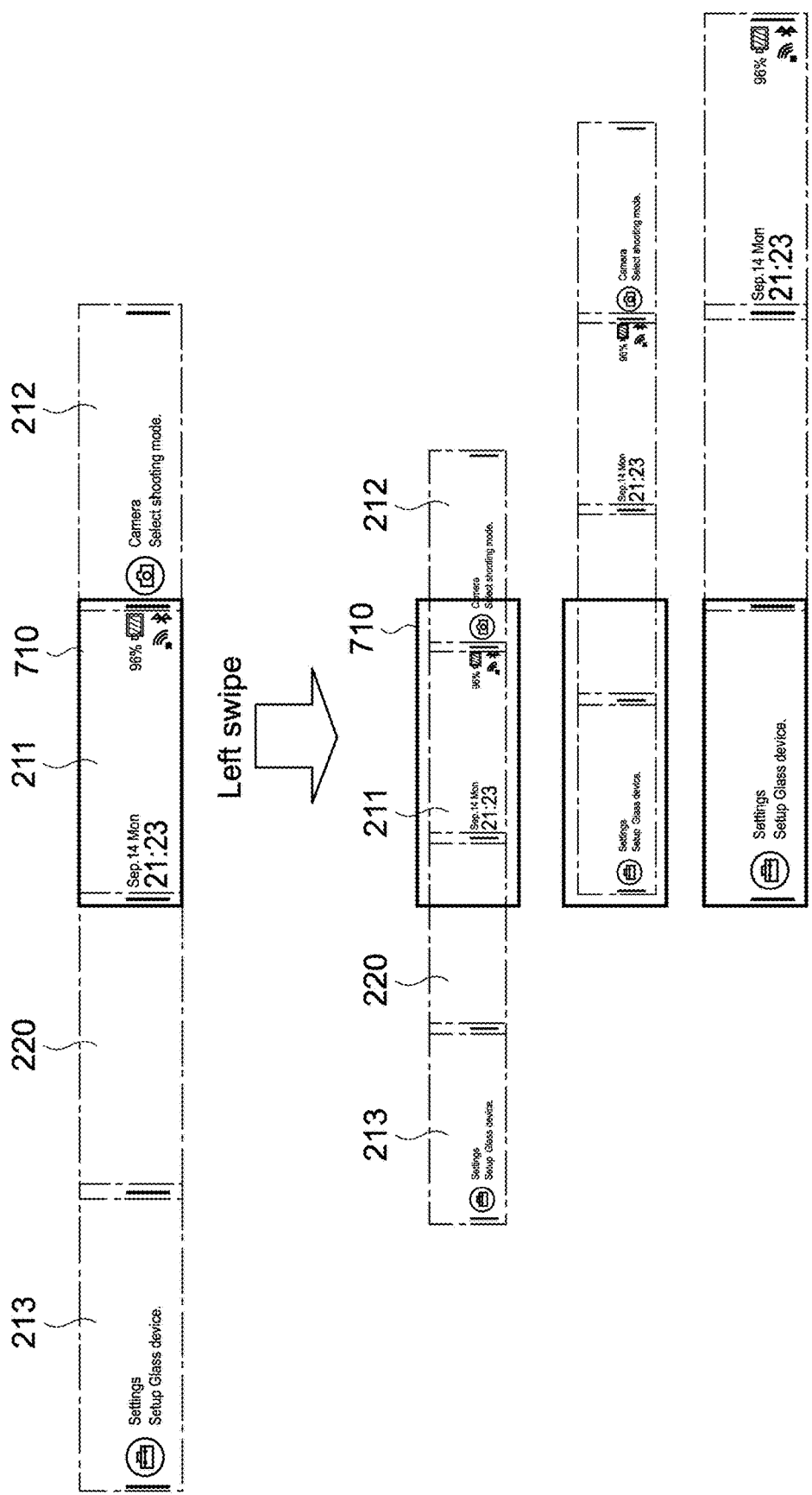
FIG. 10 An image transition diagram explaining a second animation image according to a second embodiment of the present technology.

FIG. 10 is an image transition diagram of the card layer 200 according to a second embodiment of the present technology. Hereinafter, mainly components different from those of the first embodiment will be described, the same components as those of the above-mentioned embodiment will be denoted by the same symbols, and descriptions thereof will be omitted or simplified.

In the wearable apparatus 70 in this embodiment, when detecting a swipe operation that passes across a loop gap, the firmware 45 is configured to display the second animation image smaller than the first animation image.

For example, as shown in the upper section of FIG. 10, when detecting a left swipe operation to slide the display region 710 to the left in a state in which the home screen 211 (top image) is displayed, the firmware 45 causes the display unit 71 to reproduce the second animation image and then display the setting screen 213 as sequentially shown in the three pictures in the lower section of FIG. 10. Note that the camera screen 212 is not shown in the lowermost section of FIG. 10.

As in the first embodiment, in the second animation image, the image of the home screen 211 disappears from the display unit 71 while moved in the right-hand direction at the above-mentioned predetermined speed and the setting screen 213 is displayed on the display unit 71 while moved in the right-hand direction at the above-mentioned predetermined speed. This embodiment is different from the first embodiment in that the images are moved and displayed with the screen size being reduced in comparison with the normal state. When the movement and transition to the setting screen 213 are completed, the setting screen 213 is enlarged to the normal screen size.

Note that, regarding the first animation image, the movement and transition of the screen having the normal screen size as in the first embodiment are shown. Further, also regarding the screen transition from the setting screen 213 to the home screen 211, it is moved and displayed with the screen size being reduced in the same manner as described above.

As described above, the screen transition is performed on the display mode different from the normal state, and hence the user can recognize switching between the top image and the last image.

<Third Embodiment>

Figure 11:
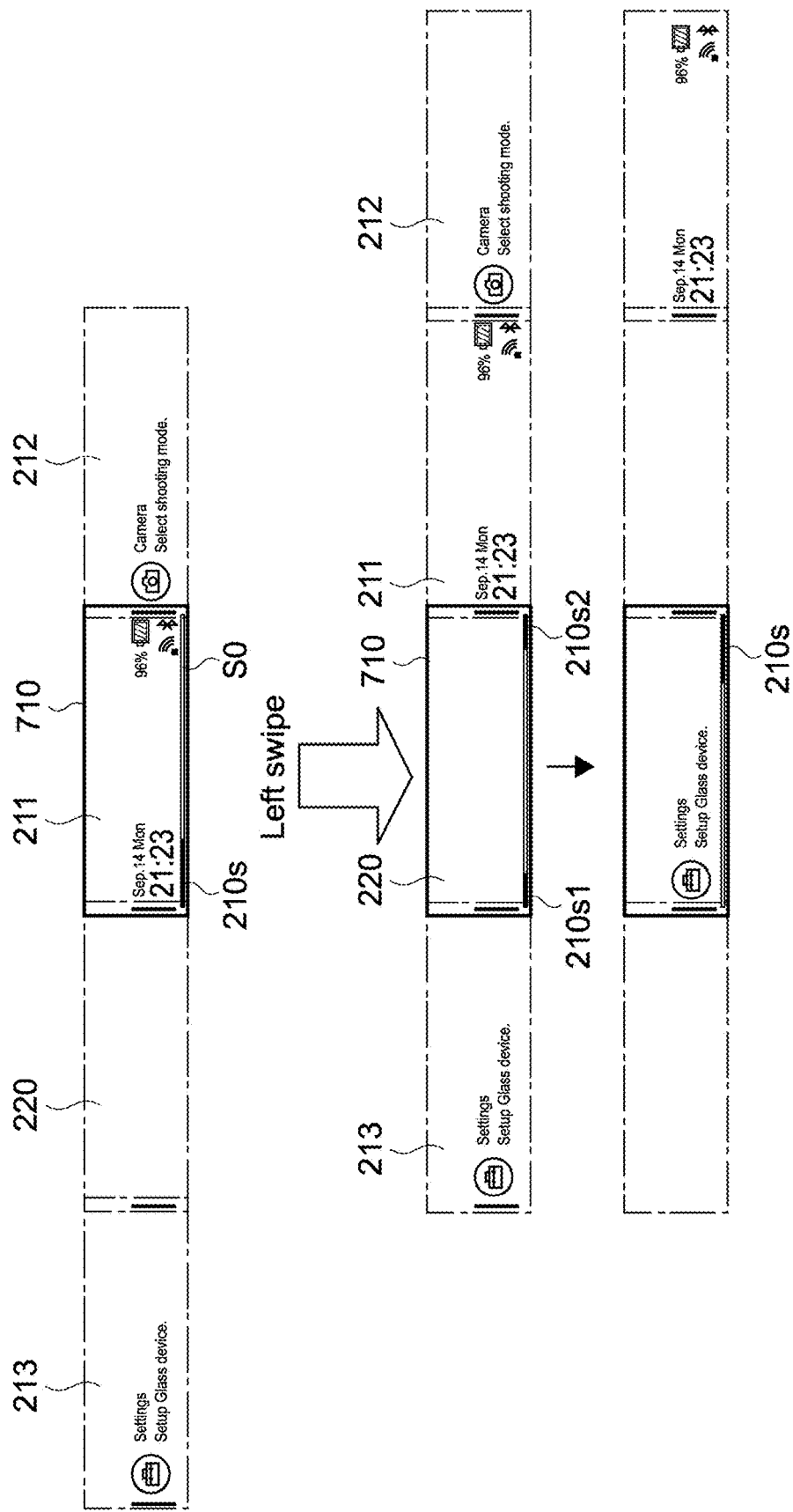
FIG. 11 An image transition diagram explaining a second animation image according to a third embodiment of the present technology.

FIG. 11 is an image transition diagram of the card layer 200 according to a third embodiment of the present technology. Hereinafter, mainly components different from those of the first embodiment will be described, the same components as those of the above-mentioned embodiment will be denoted by the same symbols, and descriptions thereof will be omitted or simplified.

In the wearable apparatus 70 in this embodiment, the firmware 45 is configured to cause the display unit 71 to further display a scroll bar 210s moved synchronously with switching between the images (card screens).

For example, as shown in the upper section of FIG. 11, when the firmware 45 detects a left swipe operation to slide the display region 710 to the left in a state in which the home screen 211 (top image) is displayed, the firmware 45 causes the display unit 71 to reproduce the second animation image and then display the setting screen 213 as sequentially shown in the two pictures in the lower section of FIG. 11. Although the second animation image is reproduced on the same display mode as that of the first embodiment, it may be reproduced on the same display mode as that of the second embodiment. Note that the camera screen 212 is not shown in the lowermost section of FIG. 11.

The scroll bar 210s is formed of a horizontal line having a predetermined width displayed at a lower end of the display region 710. The scroll bar 210s is displayed movable in a scale region S0 shown as an outline in the figure. The scroll bars 210s are displayed in all the card screens. The display control is performed on the scroll bars 210s to be moved synchronously with the movement of the card screens in the same direction. Therefore, due to the position of the scroll bar 210s, it becomes possible for the user to easily recognize the arrangement position of the currently displayed card screen.

Further, when displaying the second animation image, the firmware 45 is configured to divide and display the scroll bar 210s in the display region 710. In this embodiment, as shown in the center of FIG. 11, the scroll bar 210s is divided and displayed on the left- and right-hand sides during reproduction of the blank screen 220. A scroll bar 210s1 located on the left side corresponds to the scroll bar to be displayed on a screen (setting screen 213) as a movement destination and a scroll bar 210s2 located on the right side corresponds to the scroll bar to be displayed on the screen (home screen 211) before movement.

In this case, the left and right scroll bars 210s1 and 210s2 may be configured to be continuously varied in length depending on the amount of movement of the screen. For example, in the process of movement from the home screen 211 to the setting screen 213, display control can be performed such that the left scroll bar 210s1 is gradually increased in length and the right scroll bar 210s2 is gradually reduced in length.

Figure 12:
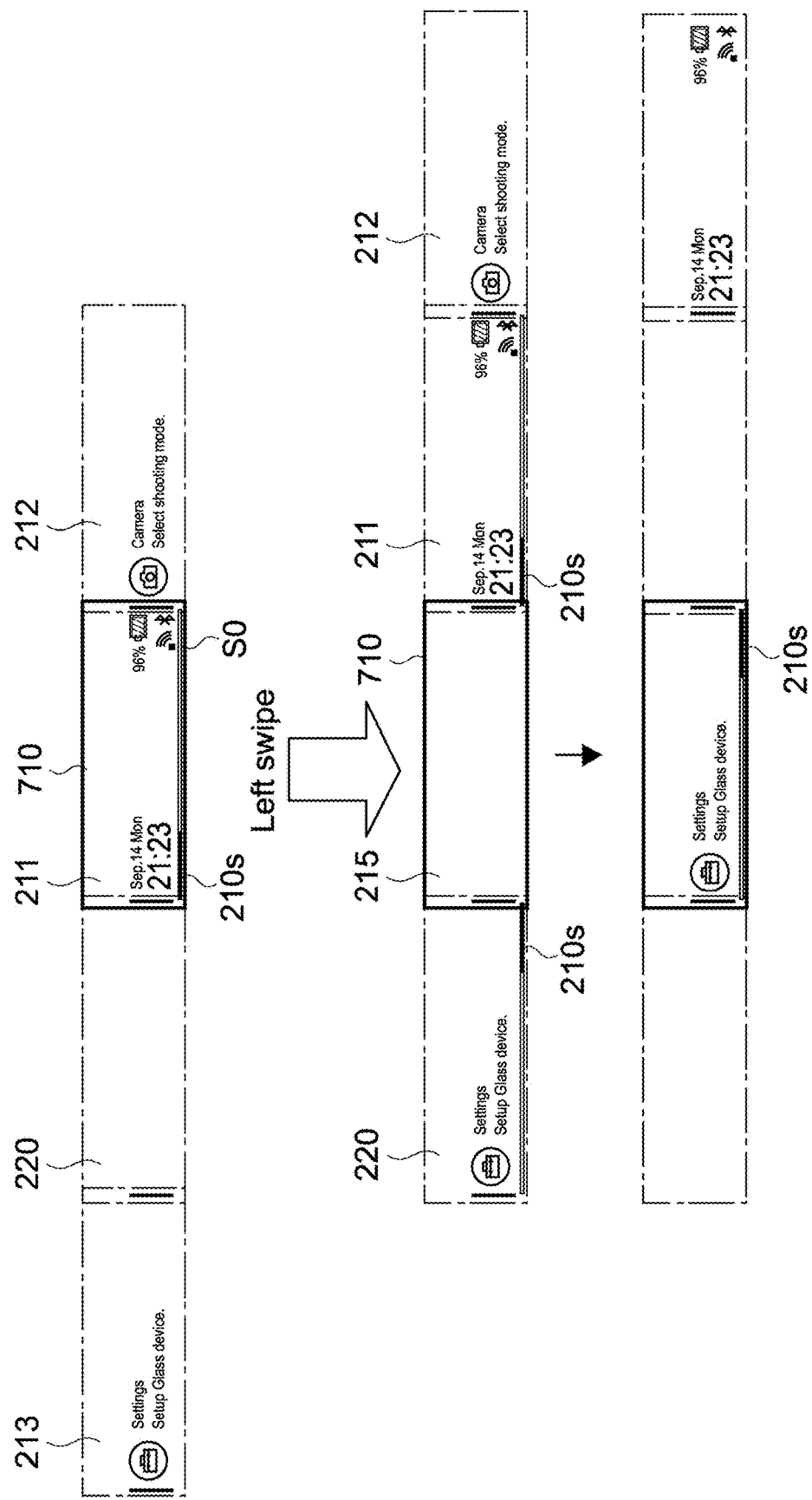
FIG. 12 A diagram showing a modified example of the second animation image.

Note that the scroll bar 210s may disappear from the display region 710 when the second animation image is reproduced as shown in FIG. 12. In this case, the scroll bar 210s disappears, and hence the user can intuitively recognize a difference from the normal screen transition.

Although the embodiments of the present technology have been described above, it is needless to say that the present technology is not limited only to the above-mentioned embodiments and various modifications can be made without departing from the gist of the present technology.

For example, in the above-mentioned embodiments, by displaying the blank screen 220 when the second animation image is reproduced, a reproduction time thereof is longer than the first animation image. Alternatively, by setting the image movement speed of the second animation image to be lower than the image movement speed of the first animation image, the reproduction time of the second animation image may be set to be longer than the reproduction time of the first animation image.

Although the screen transition in the card layer 200 is exemplified in the above-mentioned embodiments, it is not limited thereto and the present technology is also applicable to the screen transition between the plurality of images belonging to other groups such as the app layer 300.

Further, the firmware 45 may be configured to reproduce, in reproduction of the first animation image and the second animation image, different sound effects through the audio device unit 58. That is, the wearable apparatus 70 may further include a sound output unit that reproduces a first sound when the first middle image is displayed on the display unit 71 and reproduces a second sound different from the first sound when the second middle image is displayed on the display unit 71. A sound effect different from that in the normal swipe is output during swiping of the card, and hence it is possible to more easily recognize the loop gap.

Further, although the card screens are scrolled (transitioned) in the left- and right-hand directions of the field of view in the above-mentioned embodiments, it is not limited thereto. For example, the screens may be scrolled in the upper and lower directions of the field of view. The screens may be interchanged with one another from a deep side to a front side of the field of view.

In addition, although all the card screens 210 belonging to the card layer 200 are configured to be stored in the memory 52 of the control box 50 in the above-mentioned embodiments, it is not limited thereto. For example, if the number of card images 215 is equal to or larger than a predetermined number, the companion app 25 of the portable terminal 30 may store all the registered card images 215 in the memory 32. In this case, the firmware 45 stores a predetermined number of card images 215 of them (e.g., predetermined number of card images 215 in registration order) in the memory 52 of the control box 50. Then, the firmware 45 extracts a card image 215, which is specified by the user via the touch panel 55, from the memory 52 and displays it on the display unit 71. Further, the firmware 45 requests transmission of a card image 215 from the memory 32 of the portable terminal 30 via the companion app 25 if necessary and receives it and displays it on the display unit 71. With this, it is possible to smoothly switch the card screens 210 while reducing a necessary memory capacity in the control box 50 or reducing the cost by the use of the smaller-capacity memory.

In addition, although the wearable apparatus is exemplified as the electronic apparatus in the above-mentioned embodiments, the present technology is also applicable to other electronic apparatuses such as a portable phone, a smartphone, a personal computer (PC), a PC tablet, and a portable game console.

It should be noted that the present technology may also take the following configurations.

(1) A wearable apparatus, including:
a display unit configured to display an image;
an operation section configured to receive input of a predetermined operation event for switching an image to be displayed on the display unit;
a storage unit configured to store a plurality of images to be displayed on the display unit; and
a display control unit configured to be capable of sequentially switching the images to be displayed on the display unit every time the predetermined operation event is received, and to cause the display unit to display a first middle image during switching between the individual images from a top image to be first displayed on the display unit to a last image to be last displayed and cause the display unit to display a second middle image different from the first middle image during switching between the last image and the top image.

(2) The wearable apparatus according to (1), in which
the first middle image has a first reproduction time, and
the second middle image has a second reproduction time longer than the first reproduction time.

(3) The wearable apparatus according to (2), in which
the first middle image includes a first animation image in which the currently displayed first image disappears from the display unit while moved in a predetermined direction and at the same time the second image to be displayed subsequently to the first image is displayed on the display unit while moved the second image in the predetermined direction.

(4) The wearable apparatus according to (3), in which
the second middle image includes a second animation image in which one image of the top image and the last image disappears from the display unit while moved in the predetermined direction and then the other image is displayed on the display unit while moved in the predetermined direction.

(5) The wearable apparatus according to (4), in which
the second animation image further includes a predetermined image to be displayed after the one image disappears from the display unit and before the other image is displayed on the display unit.

(6) The wearable apparatus according to (4), in which
the display control unit is configured to display the second animation image smaller than the first animation image.

(7) The wearable apparatus according to any one of (1) to (6), in which
the top image and the last image include predetermined images to be displayed at symmetrical positions.

(8) The wearable apparatus according to any one of (1) to (7), in which
the display control unit is configured to cause the display unit to further display a scroll bar that is moved synchronously with switching between the images.

(9) The wearable apparatus according to (8), in which
the display control unit is configured to cause the display unit to divide and display the scroll bar when causing the display unit to display the second middle image.

(10) The wearable apparatus according to (8), in which
the display control unit is configured to cause the scroll bar to disappear from the display unit when causing the display unit to display the second middle image.

(11) The wearable apparatus according to any one of (1) to (10), further including
a sound output unit configured to
reproduce a first sound when the first middle image is displayed on the display unit, and
reproduce a second sound different from the first sound when the second middle image is displayed on the display unit.

(12) The wearable apparatus according to any one of (1) to (11), further including
a mounting unit that includes the display unit and is configured to be mountable on a user's head.

DESCRIPTION OF SYMBOLS

30 portable terminal
45 firmware
50 control box
55 touch panel
52 memory
70 wearable apparatus
71 display unit
100 information processing system
210 card screen
210v, 210v1, 210v2 boundary image
210s, 210s1, 210s2 scroll bar
211 home screen
212 camera screen
213 setting screen
220 blank screen

The invention claimed is:
1. A wearable apparatus, comprising:
a display configured to display a plurality of images;
an input device configured to receive input of a predetermined operation event for switching between the plurality of images to be displayed on the display;
a storage device configured to store the plurality of images to be displayed on the display; and
a display controller including a central processing unit (CPU) and a memory storing instructions that, when executed by the CPU, are configured to sequentially switch the plurality of images to be displayed on the display every time the predetermined operation event is received, to cause the display to display a first transition image during switching between individual images of the plurality of images from a top image of the plurality of images to be first displayed on the display to a last image of the plurality of images to be last displayed and to cause the display to display a second transition image different from the first transition image during switching across a loop gap between the last image and the top image, wherein the second transition image is different from the plurality of images to be displayed on the display, wherein the first transition image includes a first animation image in which a currently displayed first image disappears from the display while moved in a predetermined direction and at the same time a second image to be displayed subsequently to the first image is displayed on the display while moved in the predetermined direction, wherein the second transition image includes a second animation image in which one image of the top image and the last image disappears from the display while moved in the predetermined direction and then the other image of the top image and the last image is displayed on the display while moved in the predetermined direction, and wherein the display controller is configured to display the second animation image smaller than the first animation image.

2. The wearable apparatus according to claim 1, wherein he first transition image has a first reproduction time, and the second transition image has a second reproduction time longer than the first reproduction time.

3. The wearable apparatus according to claim 1, wherein the second animation image further includes a predetermined image to be displayed after the one image of the top image and the last image disappears from the display and before the other image of the top image and the last image is displayed on the display.

4. The wearable apparatus according to claim 1, wherein the top image and the last image include predetermined images to be displayed at symmetrical positions.

5. The wearable apparatus according to claim 1, wherein the display controller is configured to cause the display to further display a scroll bar that is moved synchronously with switching between the plurality of images.

6. The wearable apparatus according to claim 5, wherein the display controller is configured to cause the display to divide the scroll bar and display the divided scroll bar when causing the display to display the second transition image.

7. The wearable apparatus according to claim 5, wherein the display controller is configured to cause the scroll bar to disappear from the display when causing the display to display the second transition image.

8. The wearable apparatus according to claim 1, further comprising
a sound output device configured to
reproduce a first sound when the first transition image is displayed on the display, and
reproduce a second sound different from the first sound when the second transition image is displayed on the display.

9. The wearable apparatus according to claim 1, further comprising
a mounting unit that includes the display and is configured to be mountable on a user's head.

10. An electronic apparatus, comprising:
a display configured to display a plurality of images;
an input device configured to receive input of a predetermined operation event for switching between the plurality of images to be displayed on the display;
a storage device configured to store the plurality of images to be displayed on the display; and
a display controller including a central processing unit (CPU) and a memory storing instructions that, when executed by the CPU, are configured to sequentially switch the plurality of images to be displayed on the display every time the predetermined operation event is received, to cause the display to display a first transition image during switching between individual images of the plurality of images from a top image of the plurality of images to be first displayed on the display to a last image of the plurality of images to be last displayed and to cause the display to display a second transition image different from the first transition image during switching across a loop gap between the last image and the top image, wherein the second transition image is different from the plurality of images to be displayed on the display, wherein the first transition image includes a first animation image in which a currently displayed first image disappears from the display while moved in a predetermined direction and at the same time a second image to be displayed subsequently to the first image is displayed on the display while moved in the predetermined direction, wherein the second transition image includes a second animation image in which one image of the top image and the last image disappears from the display while moved in the predetermined direction and then the other image of the top image and the last image is displayed on the display while moved in the predetermined direction, and wherein the display controller is configured to display the second animation image smaller than the first animation image.

11. An image control apparatus, comprising:
an input device configured to receive input of a predetermined operation event for switching between a plurality of images to be displayed on a display of an electronic apparatus;
a storage device configured to store the plurality of images to be displayed on the display; and
a display controller including a central processing unit (CPU) and a memory storing instructions that, when executed by the CPU, are configured to sequentially switch the plurality of images to be displayed on the display every time the predetermined operation event is received, to cause the display to display a first transition image during switching between individual images of the plurality of images from a top image of the plurality of images to be first displayed on the display to a last image of the plurality of images to be last displayed and to cause the display to display a second transition image different from the first transition image during switching across a loop gap between the last image and the top image, wherein the second transition image is different from the plurality of images to be displayed on the display, wherein the first transition image includes a first animation image in which a currently displayed first image disappears from the display while moved in a predetermined direction and at the same time a second image to be displayed subsequently to the first image is displayed on the display while moved in the predetermined direction, wherein the second transition image includes a second animation image in which one image of the top image and the last image disappears from the display while moved in the predetermined direction and then the other image of the top image and the last image is displayed on the display while moved in the predetermined direction, and wherein the display controller is configured to display the second animation image smaller than the first animation image.

12. A display control method for an electronic apparatus including a display, comprising:
sequentially switching, by a central processing unit (CPU) and a memory, a plurality of images stored in the memory to be displayed on the display every time a predetermined operation event is received;
causing, by the CPU and the memory, the display to display a first transition image during switching between individual images of the plurality of images from a top image to the plurality of images to be first displayed on the display to a last image of the plurality of images to be last displayed; and causing, by the CPU and the memory, the display to display a second transition image different from the first transition image during switching across a loop gap between the last image and the top image, wherein the second transition image is different from the plurality of images to be displayed on the display, wherein the first transition image includes a first animation image in which a currently displayed first image disappears from the display while moved in a predetermined direction and at the same time a second image to be displayed subsequently to the first image is displayed on the display while moved in the predetermined direction, wherein the second transition image includes a second animation image in which one image of the top image and the last image disappears from the display while moved in the predetermined direction and then the other image of the top image and the last image is displayed on the display while moved in the predetermined direction, and wherein the CPU and the memory are configured to display the second animation image smaller than the first animation image.

13. A wearable apparatus, comprising:

a display configured to display a plurality of images;

an input device configured to receive input of a predetermined operation event for switching between the plurality of images to be displayed on the display;

a storage device configured to store the plurality of images to be displayed on the display; and a display controller including a central processing unit (CPU) and a memory storing instructions that, when executed by the CPU, are configured to sequentially switch the plurality of images to be displayed on the display every time the predetermined operation event is received, and to display predetermined transition images, which are not present in the other plurality of images to be displayed on the display, in a top image of the plurality of images to be first displayed on the display and a last image of the plurality of images to be last displayed, wherein a first transition image includes a first animation image in which a currently displayed first image disappears from the display while moved in a predetermined direction and at the same time a second image to be displayed subsequently to the first image is displayed on the display while moved in the predetermined direction, wherein a second transition image includes a second animation image in which one image of the top image and the last image disappears from the display while moved in the predetermined direction and then the other image of the top image and the last image is displayed on the display while moved in the predetermined direction, and wherein the display controller is configured to display the second animation image smaller than the first animation image.

* * * * *